(12) United States Patent
Ding et al.

(10) Patent No.: US 9,830,016 B2
(45) Date of Patent: Nov. 28, 2017

(54) TOUCH DISPLAY PANEL, TOUCH DISPLAY DEVICE AND TOUCH DETECTION METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 250 days.

(21) Appl. No.: 14/436,846

(22) PCT Filed: Oct. 1, 2014

(86) PCT No.: PCT/CN2014/088074
§ 371 (c)(1),
(2) Date: Apr. 17, 2015

(87) PCT Pub. No.: WO2015/165213
PCT Pub. Date: Nov. 5, 2015

(65) Prior Publication Data
US 2016/0253037 A1 Sep. 1, 2016

(30) Foreign Application Priority Data
Apr. 29, 2014 (CN) .......................... 2014 1 0178036

(51) Int. Cl.
*G06F 3/044* (2006.01)
*G06F 3/041* (2006.01)
*G09G 3/36* (2006.01)

(52) U.S. Cl.
CPC ............ *G06F 3/0418* (2013.01); *G06F 3/044* (2013.01); *G06F 3/0412* (2013.01); *G09G 3/36* (2013.01);
(Continued)

(58) Field of Classification Search
CPC .... G02F 1/13338; G06F 3/0412; G06F 3/044; G06F 2203/04103
See application file for complete search history.

(56) References Cited

U.S. PATENT DOCUMENTS

| 2010/0295824 A1* | 11/2010 | Noguchi | G02F 1/13338 345/175 |
| 2012/0162104 A1* | 6/2012 | Chang | G06F 3/0412 345/173 |
| 2014/0368467 A1* | 12/2014 | Park | G06F 3/0412 345/174 |

FOREIGN PATENT DOCUMENTS

| CN | 103226423 A | 7/2013 |
| CN | 103955323 A | 7/2014 |

OTHER PUBLICATIONS

Feb. 2, 2015—(PCT) Written Opinion of the International Searching Authority—Eng. Tran.

* cited by examiner

*Primary Examiner* — Bryan Earles
(74) *Attorney, Agent, or Firm* — Banner & Witcoff, Ltd.

(57) ABSTRACT

Disclosed is a touch display panel, a touch display device and a touch detection method. The touch display panel includes receiving electrodes and transmitting electrodes, and further includes a plurality of transparent electrodes and
(Continued)

a touch detecting circuit. The transparent electrodes are disposed on a substrate at a touching side of the display panel and one-to-one connected and correspond to the transmitting electrodes. The touch detecting circuit is connected to individual transparent electrodes, and includes a voltage switch unit, a storage unit and a processing unit. The processing unit is configured for measuring actual display data and actual touch data of each touch node, finding corresponding initial touch data, and removing influence caused by the corresponding initial touch data from the actual touch data to obtain an actual output.

15 Claims, 2 Drawing Sheets

(52) U.S. Cl.
CPC ......... *G09G 3/3607* (2013.01); *G09G 3/3696* (2013.01); *G06F 2203/04103* (2013.01); *G09G 2354/00* (2013.01)

TOUCH DISPLAY PANEL, TOUCH DISPLAY DEVICE AND TOUCH DETECTION METHOD

The application is a U.S. National Phase Entry of International Application No. PCT/CN2014/088074 filed on Oct. 1, 2014, designating the United States of America and claiming priority to Chinese Patent Application No. 201410178036.9 filed on Apr. 29, 2014. The present application claims priority to and the benefit of the above-identified applications and the above-identified applications are incorporated by reference herein in their entirety.

FIELD OF THE ART

Embodiments of the invention relate to a touch display panel, a touch display device and a touch detection method.

BACKGROUND

In comparison with a keypad and mouse, a touch screen as an input media provides a user with better convenience. Based on different implementation principles, touch screens may be classified into resistive touchscreens, capacitive touchscreens, surface acoustic wave touchscreens and infrared touchscreens and so on. Currently resistive and capacitive touchscreen technologies are widely used.

Mutual capacitive touch screens have the advantages of high sensitivity and multi-touch. The basic principle of mutual capacitive touchscreens is as follows: when a voltage is applied to a drive line, a signal change is detected from a detection line. The drive line determines a coordinate along an X direction and the detection line determines a coordinate along a Y direction. When detection is performed, X directional drive lines are scanned one by one. When each drive line is being scanned, signals on individual detection lines are read. In this way, every intersecting points of rows and columns may be scanned in one round, thus, X×Y signals are obtained totally. Such a detection method may determine coordinates of multiple points, thereby realizing multi-touch. An equivalent circuit of the detection method is illustrated in FIG. 1, wherein 101 represents a signal source, 102 represents a mutual capacitor between a drive line and a detection line, 103 represents a drive line resistor, 104 represents parasitic capacitors respectively formed between the drive line and a common electrode layer and between the detection line and the common electrode layer, 105 represents a detection line resistor, and 106 represents the detection circuit. When a finger touches the panel, a part of current flows to the finger, which is equivalent to a change in the mutual capacitance 102 between the drive line and the detection line. A small current change caused by such a change in the mutual capacitance may be detected at the detection terminal, and then a result whether the screen is touched is output.

In an Advanced Super Dimension Switch (ADS) touch screen integrating a capacitive touchscreen and a liquid crystal display, a transmitting electrode (TX) and a receiving electrode (RX) respectively have a large coupling capacitance with electrodes on an array substrate, such that liquid crystals will be deviated when the finger has not touched the liquid crystal screen yet. Deviation of liquid crystals will influence the touch detection. The uncertainty of liquid crystal deviation makes it impossible to distinguish between the differences caused by touch of the finger and the liquid crystal deviation, thereby leading to failure of detection.

SUMMARY

An aspect of the invention provides a touch display panel, comprising a plurality of receiving electrodes and a plurality of transmitting electrodes disposed in the display panel, the receiving electrodes and the transmitting electrodes are disposed in a cross manner and insulated from each other. The touch display panel further comprises a plurality of transparent electrodes and a touch detecting circuit, wherein the transparent electrodes are disposed on a substrate at a touching side of the display panel, and the transparent electrodes are one-to-one connected and correspond to the transmitting electrodes in the display panel. The touch detecting circuit is connected to individual transparent electrodes, and comprises a voltage switch unit, a storage unit and a processing unit. The voltage switch unit is configured for connecting the transparent electrodes to a common level during a display stage and setting the transparent electrodes to a high resistance state during a touch detection stage. The storage unit is configured for storing initial display data during the display stage when no touch happens and initial touch data during the touch detection stage when no touch happens, of each touch node within each grayscale range. The processing unit is configured for measuring actual display data of each touch node when touch happens during the display stage and measuring actual touch data of each touch node when touch happens during the following touch detection stage, and for finding, for each of the touch nodes, corresponding initial touch data in the corresponding grayscale range according to initial display data closest to the actual display data in the storage unit, and removing influence caused by the corresponding initial touch data from the actual touch data to obtain an actual output during the touch detection stage.

As an example, the touch detecting circuit further comprises: a calibration unit connected to the storage unit and configured for updating the initial display data and initial touch data stored in the storage unit when the touch display panel initially operates.

As an example, the initial display data, the initial touch data, the actual display data and the actual touch data are currents.

As an example, the initial display data, the initial touch data, the actual display data and the actual touch data are voltages.

As an example, the transparent electrodes are ITO electrodes.

As an example, the touch display panel is a touchscreen based on ADS technology.

As an example, the touch display panel further comprises an array substrate and a liquid crystal layer disposed between the array substrate and the substrate.

As an example, the receiving electrodes are disposed between the substrate and the liquid crystal layer, and the transmitting electrodes are disposed between the array substrate and the liquid crystal layer.

As an example, the touch display panel further comprises common electrodes disposed on the array substrate and configured as one-to-one corresponding to the receiving electrodes.

A further aspect of the invention provides a touch display device comprising the above touch display panel.

Still another aspect of the invention provides a touch detection method performed by using the above touch display panel, comprising: measuring and storing, initial display data during the display stage when no touch happens and the transparent electrodes are connected to the common level and initial touch data during the touch detection stage when no touch happens and the transparent electrodes are set to high resistance stage, of each touch node within each grayscale range; measuring actual display data of each touch node during the display stage when touch happens and finding corresponding initial touch data in the corresponding grayscale range according to the stored initial display data closest to the actual display data; measuring actual touch data of each touch node during touch detection stage when touch happens; and removing influence caused by the corresponding initial touch data from the actual touch data for each of the touch nodes to obtain an actual output during the touch detection stage.

As an example, the touch detection method further comprises a step of updating the stored initial display data and initial touch data during initial operation.

As an example, the step of removing influence caused by the corresponding initial touch data from the actual touch data comprises subtracting the initial touch data from the actual touch data.

As an example, the initial display data, the initial touch data, the actual display data and the actual touch data are currents.

As an example, the initial display data, the initial touch data, the actual display data and the actual touch data are voltages.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
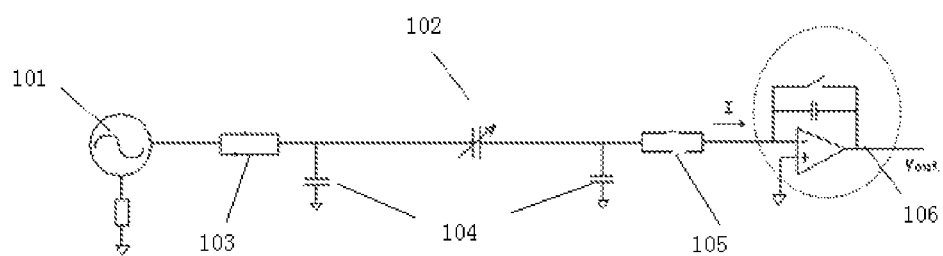
FIG. 1 schematically illustrates an equivalent circuit of a touch display panel.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the context, initial display data, initial touch data and actual touch data of each touch node are measured from the receiving electrodes. A data having 'display', such as initial display data, actual display data, refers to a working stage of display when it is being measured; a data having 'touch', such as initial touch data, actual touch data, refers to a working stage of touch detection when it is being measured. During a frame display period, a stage when the transparent electrodes are connected to the common level is referred to as the 'display stage', and a stage when the transparent electrodes are in a high resistance state is referred to as the 'touch detection stage'. 'Initial' data indicates data measured when the finger has not touched the display panel; and 'actual' data indicates data measured after the finger touched the display panel.

In the context, 'grayscale' represents different level of brightness from the darkest to the brightest. The more level there is, the better the display effect is rendered. Taking an 8bit panel as an example, it can represent 256 brightness level (2 to the power of 8, i.e., $2^8$) and therefore referred to as 256 grayscales. The term 'grayscale range' is used to increase the computation efficiency, that is, all the grayscales are divided into several segments, and each segment is a grayscale range (for example comprising two or more grayscales). Several initial touch currents corresponding to several grayscales within each grayscale range are averaged to obtain an average initial touch current corresponding to the grayscale range, thereby saving storage and computation resources. It is also possible to have only one grayscale in every grayscale range.

The principle of the invention is as follows: a liquid crystal at each touch node has a fixed deviation under each grayscale. While the deviation is fixed, the influence on the touch detection is also fixed; therefore the initial touch data measured during the touch detection stage when the transparent electrodes are set to a high resistance state and no touch happens may be considered as the influence caused by the liquid crystal deviation. As the liquid crystal deviation is kept unchanged from the display stage to the subsequent touch detection stage, the actual display data measured in the display stage when the transparent electrodes are connected to the common level may be used to find the corresponding initial touch data in the same grayscale, thereby eliminating the influence caused by the liquid crystal deviation from the actual touch data obtained during actual measurement (that is, to subtract the initial touch data or to perform other calculations based on real needs), to obtain the final touch detection data, thereby eliminating the influence caused by the liquid crystal deviation to the touch detection.

An embodiment of the invention provides a touch display panel, comprising a plurality of receiving electrodes 1 and a plurality of transmitting electrodes 2 disposed in the display panel, the receiving electrodes 1 and the transmitting electrodes 2 are disposed in a cross manner and insulated from each other. The touch display panel further comprises a plurality of transparent electrodes 3 and a touch detecting circuit 4.

The transparent electrodes 3 are disposed on a substrate 5 at a touching side of the display panel, and the transparent electrodes 3 are one-to-one correspond and connected to the transmitting electrodes 2 in the display panel.

The touch detecting circuit 4 is connected to individual transparent electrodes 3, and the touch detecting circuit 4 further comprises a voltage switch unit 6, a storage unit 7 and a processing unit 8.

The voltage switch unit 6 is configured for connecting the transparent electrodes 3 to a common level during a display stage and setting the transparent electrodes 3 to a high resistance state during a touch detection stage.

The storage unit 7 is configured for storing initial display data during the display stage when no touch happens and initial touch data during the touch detection stage when no touch happens, of each touch node within each grayscale range.

The processing unit 8 is configured for measuring actual display data of each touch node when touch happens during the display stage and measuring actual touch data of each touch node when touch happens during the following touch detection stage and for finding corresponding initial touch data in the corresponding grayscale range according to initial display data closest to the actual display data in the storage unit 7, and removing the corresponding initial touch data from the actual touch data to obtain an actual output data during the touch detection stage.

The actual output data is output to a determination unit (not shown, and may be in the touch detecting circuit or a processor or logic circuit connected thereto) to determine whether touch happens at a touch node.

Figure 2:
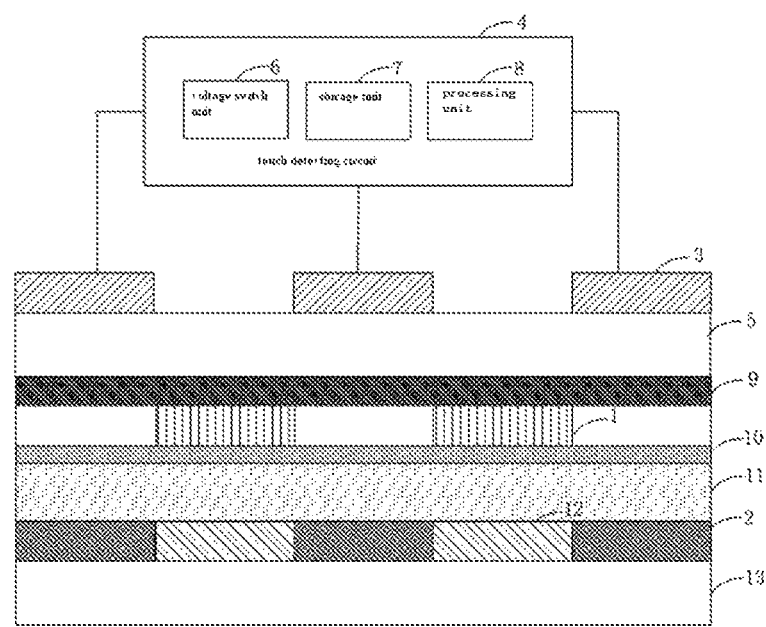
FIG. 2 schematically illustrates a configuration of a touch display panel in accordance with an embodiment of the invention.

In FIG. 2, numeral 9 represents a black matrix, 10 represents a pixel element layer, 11 represents a crystal liquid layer, 12 represents common electrodes (having a common level Vcom), and 13 represents an array substrate.

It is thus seen that, in the touch display panel provided by the embodiment of the invention, it is possible to calibrate the actual touch data in the touch detection stage according to the initial display data and initial touch data of each touch node in different grayscale ranges, thereby eliminating the influence caused by the liquid crystal deviation on the mutual capacitance change, and obtaining precise finger touch data. The embodiment of the invention significantly increases the touch detection precision of the touch display panel and has a simple configuration and is highly practical.

As an example, the touch detecting circuit 4 further comprises a calibration unit (not shown) connected to the storage unit 7. The calibration unit is configured for performing calibration during the initial operation stage of the touch display panel to obtain more accurate initial display data and initial touch data, thereby updating the storage unit 7.

The measured and stored data may be current change caused by mutual capacitance change or voltage change. Therefore, the detected data may be current or voltage.

The transparent electrodes of the embodiment of the invention are for example of an electrically conductive glass material, such as an ITO electrode.

As an example, the touch display panel of the embodiment of the invention is a mutual capacitive touch screen based on Advanced Super Dimension Switch (ADS) technology.

An embodiment of the invention further provides a touch display device comprising the above touch display panel.

Figure 3:
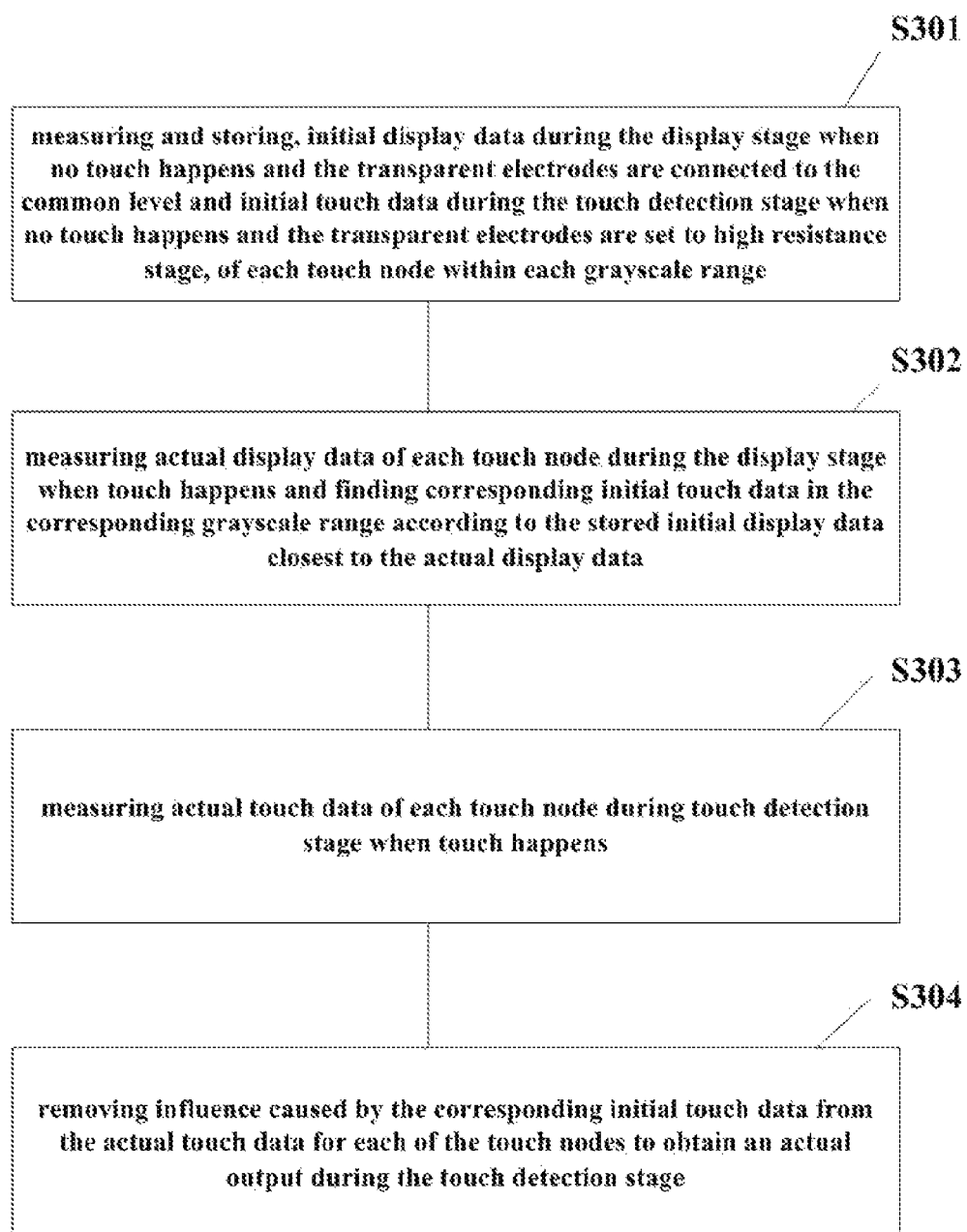
FIG. 3 illustrates a flowchart depicting a touch detection method, according to one or more aspects.

FIG. 3 illustrates a flowchart depicting a touch detection method performed by using the above touch display panel. The method comprises:

Step 301: measuring and storing, initial display data during the display stage when no touch happens and the transparent electrodes are connected to the common level and initial touch data during the touch detection stage when no touch happens and the transparent electrodes are set to high resistance stage, of each touch node within each grayscale range.

Step 302: connecting the transparent electrodes to the common level during the display stage, measuring actual display data of each touch node when touch happens and finding corresponding initial touch data in the corresponding grayscale range according to the stored initial display data closest to the actual display data.

Step 303: setting the transparent electrodes to the high resistance stage during the subsequent touch detection stage, and measuring actual touch data of each touch node when touch happens.

Step 304: removing influence caused by the corresponding initial touch data from the actual touch data for each of the touch nodes to obtain an actual output data during the touch detection stage.

As an example, to make the detection result more accurate, before step 301, the method further comprises: calibrating the surrounding environment before the initial operation stage, thereby updating the stored initial display data and stored initial touch data. In the following, the touch detection method will be explained in detail with reference to an example.

Example 1

To explain the implementation procedure of the above embodiment in detail, the example provides a touch detection method performed by the display panel of FIG. 2, wherein a plurality of receiving electrodes 1 and a plurality of transmitting electrodes 2 are disposed in the display panel, the receiving electrodes 1 and the transmitting electrodes 2 are disposed in a cross manner and insulated from each other; a plurality of ITO electrodes 3 are disposed on an outermost surface of a substrate 5 at a touching side of the touch panel and exactly opposite to the transmitting electrodes 2.

To prevent the liquid crystal deviation from influencing the touch detection, the transparent electrodes 3 are disposed on the substrate 5 at a touching side of the display panel, such as on an outermost surface of the substrate 5 (a side opposite to the liquid crystal layer 11) or on an inner surface of the substrate 5 (on the same side as the liquid crystal layer 11). In this example, the touch display panel employs ADS display mode, thus, the ITO electrodes 3 are disposed on the outermost surface of the substrate 5 at a touching side of the display panel, and are one-to-one connected and correspond to the transmitting electrodes (TX) 2; the TX2 and transparent electrodes 3 are connected to each other at the end of the display panel. The TX 2 and common electrodes 12 are alternately disposed on a side of the array substrate 13, and the receiving electrodes (RX) 1 are disposed on an inner side of the substrate 5 for being touched.

The touch detection method comprises:

Step 401: measuring and storing, initial display current during the display stage when no touch happens and the transparent electrodes are connected to the common level and initial touch current during the touch detection stage when no touch happens and the transparent electrodes are set to high resistance stage, of each touch node within each grayscale range.

In the step, the touch detecting circuit 4 is connected to all the ITO transparent electrodes 3 respectively. The voltage switch unit 6 in the touch detecting circuit 4 connects the ITO electrodes 3 to the common level Vcom during the display stage, and keeps the ITO electrodes 3 in the high resistance state during the touch detection stage. The storage unit 7 in the touch detecting circuit 4 stores initial display data measured during the display stage when no touch happens and the transparent electrodes are connected to the common level and initial touch data measured during the touch detection stage when no touch happens and the transparent electrodes are set to high resistance stage, of each touch node within each grayscale range, and updates the stored initial display data and initial touch data during the initial operation stage upon each power-on, that is, the initial display data and initial touch data within each grayscale range are re-detected and used to replace the previously stored data. In the example, the storage unit 7 stores the initial display current during the display stage when no touch happens and the transparent electrodes are connected to the common level and the initial touch current during the touch detection stage when no touch happens and the transparent electrode are set to high resistance stage.

Step 402: during the display stage, measuring actual display current of each touch node when touch happens and finding corresponding initial touch current in the corresponding grayscale range by comparison.

During the display stage, the touch detecting circuit 4 connects the ITO electrodes 3 to the common level Vcom. At this time, the touch from a finger will not affect the mutual capacitance. Each time a row driving unit (such as GOA) of the array substrate scans a set of transparent electrodes exactly facing a TX 2, the processing unit 8 may find the corresponding initial touch current in the same grayscale range corresponding to the initial display current closest to the actual display current measured at the touch node, thereby calibrating a TX area. Similarly, the corresponding initial touch currents on individual touch nodes over the whole panel during the touch detection stage may be obtained.

Step 403: measuring actual touch current of each touch node when touch happens during the touch detection stage, and output the actual touch current of the touch detection stage.

In the step, the touch detection circuit 4 sets the ITO electrodes 3 to the high resistance stage during the touch detection stage. Due to the mutual capacitance change caused by the liquid crystal deviation, the actual touch current is different from that in the ideal situation, and the initial touch current just represents the current changed caused by the mutual capacitance change due to liquid crystal deviation. Therefore, after measuring the actual touch current of each touch node, the initial touch current may be subtracted therefrom, thereby obtaining the actual output current during the touch detection stage. The actual output data reflects the change in the mutual capacitance of the liquid crystal panel merely caused by the finger touch. After obtaining the actual output current, the status of finger touch on each touch node may be determined, thereby taking actions according to touch indication from the finger.

The whole procedure of the exemplary touch detection method is finished up till now.

In the touch display panel, touch display device and touch detection method provided by the above embodiment or example, the actual touch data during the touch detection stage may be calibrated according to the initial display data and initial touch data of each touch node within different grayscale ranges, thereby eliminating influence on the mutual capacitance change caused by the liquid crystal deviation, obtaining accurate finger touch data. It not only significantly increases the touch detection precision of the touch display panel, but also is of a simple structure and highly practical.

What is described above is related to the illustrative embodiments of the disclosure only and not limitative to the scope of the disclosure; the scopes of the disclosure are defined by the accompanying claims.

This application claims the priority of Chinese Application No. 201410178036.9, filed on Apr. 29, 2014, and which application is incorporated herein by reference.

What is claimed is:

1. A touch display panel, comprising: a plurality of receiving electrodes and a plurality of transmitting electrodes disposed in the display panel, the receiving electrodes and the transmitting electrodes being disposed in a cross manner and insulated from each other; the touch display panel further comprising: a plurality of transparent electrodes and a touch detecting circuit, wherein the transparent electrodes are disposed on a substrate at a touching side of the display panel, and the transparent electrodes are one-to-one connected and correspond to the transmitting electrodes in the display panel;

the touch detecting circuit is connected to individual transparent electrodes and comprises a voltage switch unit, a storage unit and a processing unit;

wherein the voltage switch unit is configured for connecting the transparent electrodes to a common level during a display stage and setting the transparent electrodes to a high resistance state during a touch detection stage;

the storage unit is configured for storing initial display data during the display stage when no touch happens and initial touch data during the touch detection stage when no touch happens, of each touch node within each grayscale range;

the processing unit is configured for measuring actual display data of each touch node when touch happens during the display stage and measuring actual touch data of each touch node when touch happens during the following touch detection stage, and for finding, for each of the touch nodes, corresponding initial touch data in the corresponding grayscale range according to initial display data closest to the actual display data in the storage unit, and removing influence caused by the corresponding initial touch data from the actual touch data to obtain an actual output during the touch detection stage.

2. The touch display panel of claim 1, wherein the touch detecting circuit further comprises: a calibration unit connected to the storage unit and configured for updating the initial display data and initial touch data stored in the storage unit while the touch display panel initially operates.

3. The touch display panel of claim 1, wherein the initial display data, the initial touch data, the actual display data and the actual touch data are currents.

4. The touch display panel of claim 1, wherein the initial display data, the initial touch data, the actual display data and the actual touch data are voltages.

5. The touch display panel of claim 1, wherein the transparent electrodes are ITO electrodes.

6. The touch display panel of claim 1, wherein the touch display panel is a touchscreen based on advanced super dimension switch (ADS) technology.

7. The touch display panel of claim 6, further comprising: an array substrate and a liquid crystal layer, the liquid crystal layer is disposed between the array substrate and the substrate.

8. The touch display panel of claim 7, wherein the receiving electrodes are disposed between the substrate and the liquid crystal layer, and the transmitting electrodes are disposed between the array substrate and the liquid crystal layer.

9. The touch display panel of claim 7, further comprising: common electrodes disposed on the array substrate and configured as one-to-one correspond to the receiving electrodes.

10. A touch display device comprising the touch display panel of claim 1.

11. A touch detection method performed by using a touch display panel, comprising:

measuring and storing, initial display data during a display stage when no touch happens and transparent electrodes are connected to a common level and initial touch data during a touch detection stage when no touch happens and the transparent electrodes are set to high resistance stage, of each touch node within each grayscale range;

measuring actual display data of each touch node during the display stage when touch happens and finding corresponding initial touch data in the corresponding grayscale range according to the stored initial display data closest to the actual display data;

measuring actual touch data of each touch node during touch detection stage when touch happens; and removing influence caused by the corresponding initial touch data from the actual touch data for each of the touch nodes to obtain an actual output during the touch detection stage.

12. The touch detection method of claim 11, further comprising: updating the stored initial display data and initial touch data during initial operation.

13. The touch detection method of claim 12, wherein the step of removing influence caused by the corresponding initial touch data from the actual touch data comprises: subtracting the initial touch data from the actual touch data.

14. The touch detection method of claim 11, wherein the initial display data, the initial touch data, the actual display data and the actual touch data are currents.

15. The touch detection method of claim 11, wherein the initial display data, the initial touch data, the actual display data and the actual touch data are voltages.

* * * * *